Patented June 13, 1944

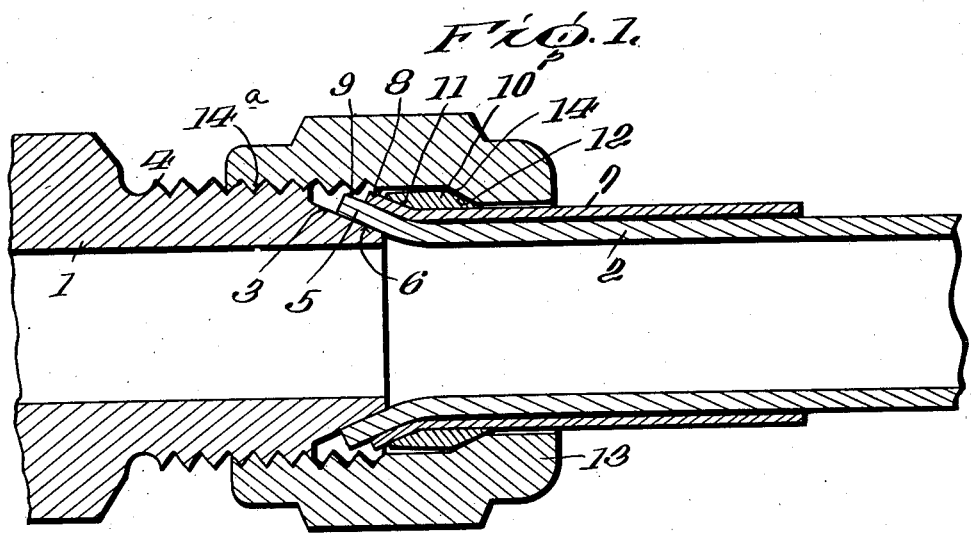
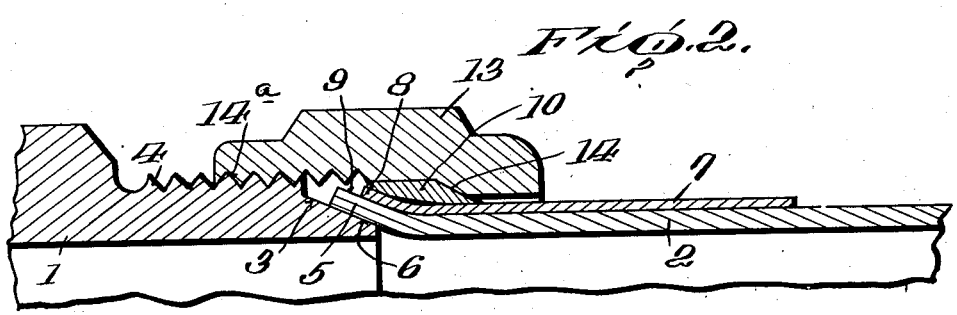
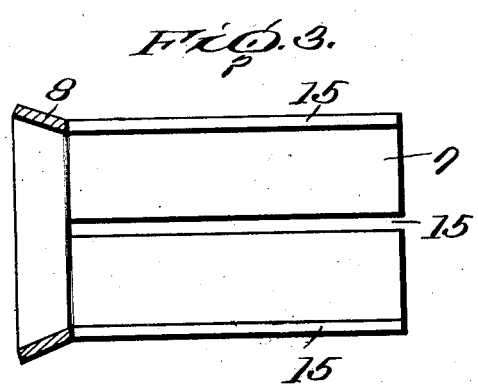
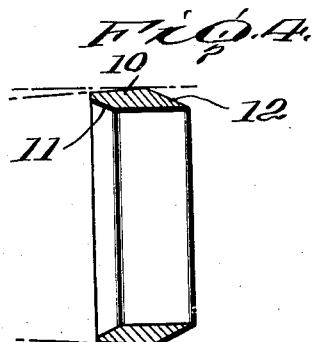

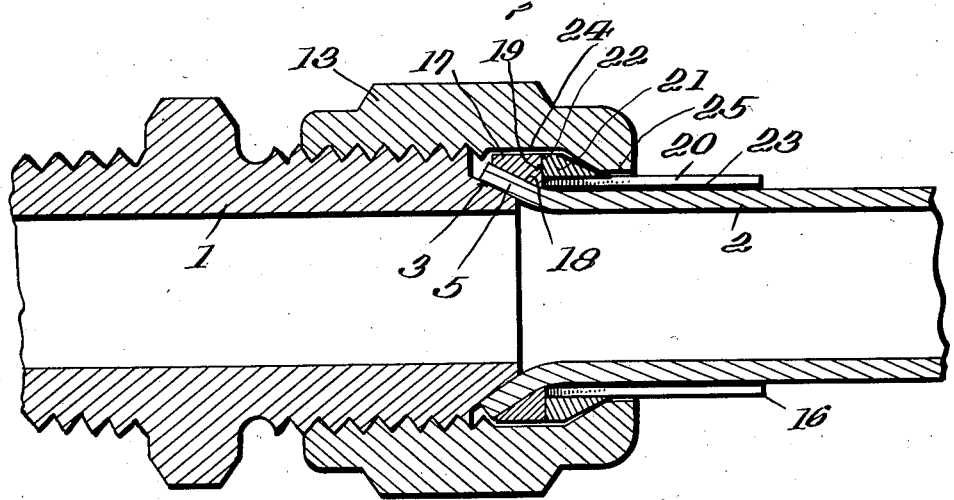
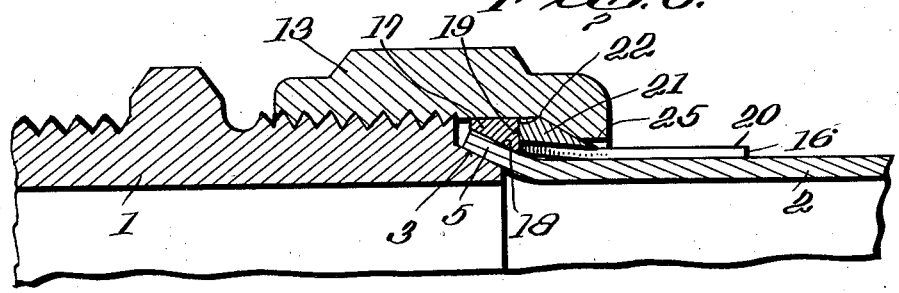
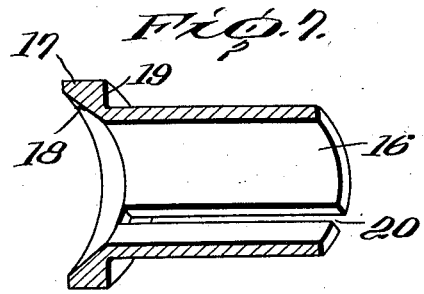

2,351,362

UNITED STATES PATENT OFFICE 2,351,362

COUPLING FOR TUBES

Arthur L. Parker, Cleveland, Ohio, assignor to The Parker Appliance Company, Cleveland, Ohio, a corporation of Ohio Application June 8, 1942, Serial No. 446,230

1 Claim. (Cl. 285—86)

The invention relates to new and useful improvements in a tube coupling of the type shown in the patent granted to Arthur L. Parker January 3, 1933, No. 1,893,442, wherein the flared end of a tube is clamped against a seat on the part to which the tube is to be attached through the cooperative action of a sleeve which contacts with the flared end of the tube and a nut which contacts with the sleeve.

An object of the invention is to provide a coupling of the above type with a clamping ring which is independent of the nut and which is so shaped that the operation of the nut thereon will cause the ring to be contracted and the sleeve to be pressed thereby against the tube and the sleeve also pressed against the end of the tube for clamping the same against the seat.

A further object of the invention is to provide a coupling of the above type wherein the sleeve projects for some distance beyond the nut and is provided with one or more slits extending longitudinally thereof from the outer end of the sleeve to a point adjacent the clamping head of the sleeve.

A still further object of the invention is to provide a coupling of the above type wherein the sleeve is of substantially uniform thickness throughout including the clamping head.

In the drawings,

Figure 1 is a longitudinal sectional view through a coupling showing the parts as initially assembled for clamping the tube against the seat;

Figure 2 is a view similar to Figure 1 but showing the coupling closed and the tube end firmly clamped against the seat;

Figure 3 is a longitudinal sectional view through the sleeve;

Figure 4 is a sectional view through the ring;

Figure 5 is a longitudinal sectional view through the coupling showing a modified shaping of the sleeve and clamping ring with the parts in position as initially assembled;

Figure 6 is a view similar to Figure 5 but showing the coupling closed and the tube end firmly clamped against the seat; and Figure 7 is a longitudinal sectional view through the clamping sleeve.

The invention has to do with a coupling which is adapted to attach the flared end of a tube against a seat on the part or coupling member to which the tube is to be attached. In carrying out the invention a sleeve is provided which surrounds the tube and the inner end of the sleeve is shaped so as to conform to the outer face of the flared end of the tube. The sleeve is provided with one or more slits extending from the outer end of the sleeve inward to a point adjacent the clamping head on the sleeve. Surrounding the sleeve is a clamping ring, the inner face of which is shaped so as to engage the sleeve for moving the same longitudinally to cause the flared end of the tube to be clamped against the seat. The outer end of said ring is tapered so as to face outwardly. The nut is provided with a shoulder having a face tapered so as to face inwardly and this face on the nut contacts with the tapered face of the ring when the coupling is closed and will contract the outer portion of the ring, causing the same to press against the sleeve and clamp the sleeve firmly against the tube. This sleeve extends outward beyond the nut for some distance and serves as a resilient restraining means for dampening the vibrations in the tube.

Referring more in detail to the drawings, the coupling as shown in Figures 1 to 4 includes a member 1 to which the tube indicated at 2 is adapted to be attached. This member 1 is provided with a tapered seat 3 and a threaded portion 4 on the outer face thereof. The tube 2 has the end thereof flared as indicated at 5. The inner face 6 of the flared end of the tube is shaped to conform to the seat and is adapted to make contact with the seat 3.

Surrounding the tube is a sleeve 7 which loosely fits the tube. This sleeve is provided with a clamping head 8, the inner face of which is shaped to substantially conform to the outer face 9 of the flared end of the tube. As shown in these figures, the sleeve is of substantially uniform thickness throughout and is made from a tube by flaring the end thereof.

Surrounding the sleeve is a clamping ring 10. The clamping ring 10 at its inner end is provided with a tapered face 11 which is shaped to conform substantially to the tapered outer face of the clamping head 8. The outer end of the clamping ring 10 is tapered as indicated at 12 so as to face outwardly upon an angle of substantially 25° to the inner face of the ring. Surrounding this clamping ring 10 is a clamping nut 13. Said clamping nut has a threaded portion 14a adapted to engage the threaded portion 4 on the member 1. The clamping nut is also recessed to receive the ring 10 and so as to provide a tapered face 14 which is preferably formed at an angle of substantially 30° to the longitudinal axis of the nut. This taper 14 faces inward and is opposed to the taper 12 on the ring. The outer face of the ring is tapered slightly away from the inner face of the nut when the parts are initially assembled and this taper is substantially 1½°.

The nut is so dimensioned that it is free from contact with the sleeve which projects outwardly beyond the nut for a considerable distance. This sleeve is provided with at least one saw-cut forming a slit which extends from the outer end of the sleeve to a point adjacent the clamping head 8. In Figure 3 the sleeve is shown as provided with four saw-cuts arranged at 90° apart. These saw-cuts are indicated at 15. It is understood that one or more of these saw-cuts may be provided, the purpose of which is to permit the sleeve to be readily contracted and provide what might be called resilient fingers extending outward beyond the end of the nut and along the tube lying in contact therewith and serving as a resilient means for dampening vibrations imparted to the tube.

When the parts as described above are first assembled the nut contacts with the ring at the extreme outer end thereof. The sleeve is free from contact with the tube except at the clamping head. The outer face of the clamping ring at the inner end thereof is spaced away from the nut to a slight extent. When the nut is turned on the threaded part and the coupling closed the ring will be contracted at the outer end portions thereof and pressed against the sleeve and will in turn cause the sleeve to be pressed into firm gripping contact with the tube in the region where it is contacted with by the ring. The slits as above noted, extend substantially to the clamping head 8 of the sleeve and therefore the portion of the ring which is contracted and pressed against the sleeve contacts with the same in the region of the slits. The inner end of the clamping ring as it is pressed against the sleeve will be slightly expanded and the degree to which it can be expanded may be limited by the nut through the contact of the ring with the inner face of the nut.

This closing of the coupling causes the flared end of the tube to be firmly pressed against the seat 3 and it also causes the sleeve to be firmly pressed against the tube in the region of the outer end of the clamping ring. The portion of the sleeve extending outward from the clamping ring is brought close to the tube but does not exert a pressure on the tube. The sleeve, however, is pressed against the tube in the region near the tube flare and the sleeve can be considered in effect a cantilever beam firmly fixed at one end wherein the force required to cause a deflection of the sleeve is greater nearer the point of support than further away from the point of support at the outer end of the sleeve. This enables the sleeve to exert a restraining action on the tube so as to dampen vibrations in the tube.

Furthermore, inasmuch as the clamping nut and ring are independent, the nut may be turned without causing the ring to turn. Therefore, there is little or no twisting strain applied to the tube during the clamping of the tube against the seat.

In Figures 5 to 7 there is shown a slightly modified form of shaping of the sleeve and the clamping ring. In this form of the invention the sleeve 16 is provided with a clamping head 17 having the inner face thereof tapered as indicated at 18, to conform to the outer face of the tube which is constructed in the manner described above. This clamping head is provided with a shoulder 19 which is disposed substantially at right angles to the outer face of the sleeve. The sleeve is provided with one or more slits 20 which extend from the outer end thereof to substantially the shoulder 19. The main difference between the sleeve in this form of the invention over that shown in Figures 1 to 4 consists in the manner of constructing the same rather than in the manner of functioning of the same. As shown in Figure 3, the sleeve is of substantially uniform thickness and can be made by cutting a length of tubing and flaring one end thereof. As shown in Figure 7, the sleeve has a solid head of larger diameter and thickness than the body of the sleeve and is made by machining or swaging. The clamping ring 21 is similar in construction to the clamping ring 10 except that the inner face thereof 22 is substantially at right angles to the inner face of the ring and is therefore shaped to conform to the shoulder 19 with which said ring makes contact. As shown in Figure 5 the sleeve is dimensioned so that there is substantial clearance space between the ring and the nut, as indicated at 24. There is likewise a substantial clearance space between the outer end of the nut and the sleeve, as indicated at 25. The parts when initially assembled are positioned relative to each other as shown in Figure 5. Upon the turning of the nut onto the threaded member 1, that is, the closing of the coupling, the outer end of the clamping ring 21 is contracted and caused to engage the sleeve a short distance away from the clamping head and in the region of the slits and will contract the sleeve so as to bring it into firm contact with the tube in the region where the ring contacts therewith. The outer portions of the sleeve will be also shifted so as to bring them close to the tube. At the same time that the sleeve is deformed and brought into proper relation to the the tube, the sleeve will be moved longitudinally of the fixed member to which the tube is to be attached and the flared end of the tube pressed firmly against the seat 3. The sleeve 16 extends outward beyond the nut the same as the sleeve 15 and functions in the same way to dampen the vibrations imparted to the tube.

It is obvious that many changes may be made in the details of construction, in the angular relation of the parts and the dimensioning of the parts without departing from the spirit of the invention as set forth in the appended claim.

What I claim is:

A coupling for metal tubes comprising a coupling member to which the flared end of the tube is to be connected, said coupling member having a seat conforming to and engaging the inner flared face of the tube, a sleeve surrounding said tube, said sleeve having a clamping head the inner face of which substantially conforms to and engages the outer face of the flared end of the tube, said sleeve having slits formed therethrough extending from a point adjacent said clamping head to the outer end of the sleeve, a clamping ring surrounding said sleeve and adapted to engage the sleeve for clamping the flared end of the tube against the seat of the coupling member, a clamping nut surrounding said sleeve and said clamping ring and having threaded engagement with the coupling member, said sleeve being dimensioned so as to extend some distance along the tube outside of said nut, said nut having an inwardly facing tapered shoulder adapted to engage an outwardly tapered face on the outer end of said ring said tapered face on said nut being of a slightly greater angle than the angle of the tapered face of the ring, whereby when said nut is turned onto said coupling member, said ring will be moved longitudinally of the tube for clamping the flared end of the tube against the seat and said ring will be contracted at its outer end so as to tightly clamp the sleeve against the tube in the region engaged by the ring, and place the portions of the sleeve extending outwardly therefrom in contact with the tube for dampening vibrations imparted thereto.

ARTHUR L. PARKER.